(12) United States Patent
Berggren et al.

(10) Patent No.: US 8,976,738 B2
(45) Date of Patent: *Mar. 10, 2015

(54) ARRANGEMENT AND METHOD FOR IMPROVING HARQ FEEDBACK IN TELECOMMUNICATION SYSTEMS

(71) Applicant: Huawei Technologies Co., Ltd., Shenzhen (CN)

(72) Inventors: Fredrik Berggren, Kista (SE); Jianghua Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/246,853

(22) Filed: Apr. 7, 2014

(65) Prior Publication Data

US 2014/0219372 A1    Aug. 7, 2014

Related U.S. Application Data

(63) Continuation of application No. 13/779,340, filed on Feb. 27, 2013, now Pat. No. 8,737,342, which is a continuation of application No. 13/196,630, filed on Aug. 2, 2011, now abandoned, which is a continuation of application No. PCT/CN2011/075380, filed on Jun. 7, 2011.

(60) Provisional application No. 61/373,399, filed on Aug. 13, 2010.

(51) Int. Cl.
*H04B 7/04* (2006.01)
*H04L 1/00* (2006.01)
*H04L 1/16* (2006.01)
*H04L 1/18* (2006.01)

(52) U.S. Cl.
CPC ............. *H04B 7/0417* (2013.01); *H04L 1/0073* (2013.01); *H04L 1/1692* (2013.01); *H04L 1/1861* (2013.01); *H04B 7/0456* (2013.01); *H04L 1/1812* (2013.01)
USPC ........................... 370/328; 370/329; 370/338

(58) Field of Classification Search
None
See application file for complete search history.

(56) References Cited

U.S. PATENT DOCUMENTS 6,807,154 B1 * 10/2004 Malmgren et al. ............ 370/252
7,639,660 B2 * 12/2009 Kim et al. ..................... 370/343

(Continued)

FOREIGN PATENT DOCUMENTS

CN    101588224 A    11/2009
CN    101636962 A    1/2010

(Continued)

OTHER PUBLICATIONS

Office Action issued in commonly owned U.S. Appl. No. 13/196,630, mailed Apr. 17, 2013.

(Continued)

*Primary Examiner* — Ian N Moore
*Assistant Examiner* — Lakeram Jangbahadur
(74) *Attorney, Agent, or Firm* — Brinks Gilson & Lione

(57) ABSTRACT

A method for execution on an apparatus configured to operate in a telecommunications network comprising a processor, wherein said processor is configured to execute said method, said method comprising encoding a plurality of uplink feedback information elements for carrier aggregation, by a set of codewords where each codeword comprises a channel, wherein at least two information elements have the same channel distribution.

19 Claims, 5 Drawing Sheets

(56) References Cited

U.S. PATENT DOCUMENTS

| | | | |
|---|---|---|---|
| 7,810,009 B2* | 10/2010 | Kwon et al. | 714/749 |
| 7,894,324 B2* | 2/2011 | Laroia et al. | 370/203 |
| 8,205,130 B2* | 6/2012 | Shinagawa et al. | 714/752 |
| 8,305,986 B2* | 11/2012 | Zhang et al. | 370/329 |
| 8,340,043 B2* | 12/2012 | Suzuki et al. | 370/329 |
| 8,355,424 B2 | 1/2013 | Xi et al. | |
| 8,374,260 B2 | 2/2013 | Schirmacher et al. | |
| 2006/0285606 A1* | 12/2006 | Khojastepour et al. | 375/267 |
| 2007/0159969 A1* | 7/2007 | Das et al. | 370/229 |
| 2007/0189151 A1* | 8/2007 | Pan et al. | 370/210 |
| 2010/0039928 A1 | 2/2010 | Noh et al. | |
| 2010/0098012 A1* | 4/2010 | Bala et al. | 370/329 |
| 2010/0118803 A1* | 5/2010 | Ishii et al. | 370/329 |
| 2010/0278034 A9* | 11/2010 | Laroia et al. | 370/209 |
| 2010/0329159 A1* | 12/2010 | Xia et al. | 370/280 |
| 2011/0085502 A1* | 4/2011 | Malladi | 370/329 |
| 2011/0116530 A1 | 5/2011 | Sambhwani | |
| 2011/0200015 A1* | 8/2011 | Bharadwaj et al. | 370/335 |
| 2011/0205996 A1* | 8/2011 | Kim et al. | 370/329 |
| 2011/0249656 A1* | 10/2011 | Cai et al. | 370/336 |
| 2012/0039342 A1 | 2/2012 | Berggren et al. | |
| 2012/0147841 A1* | 6/2012 | Zhang et al. | 370/329 |
| 2012/0218955 A1* | 8/2012 | Iochi et al. | 370/329 |
| 2012/0327911 A1* | 12/2012 | Zhang et al. | 370/335 |
| 2013/0077595 A1* | 3/2013 | Aiba et al. | 370/329 |
| 2013/0100919 A1 | 4/2013 | Han et al. | |

FOREIGN PATENT DOCUMENTS

| | | |
|---|---|---|
| CN | 101646237 A | 2/2010 |
| CN | 101674164 A | 3/2010 |

OTHER PUBLICATIONS

International Search Report and Written Opinion of the International Searching Authority issued in corresponding PCT Application No. PCT/CN2011/075380; mailed Sep. 22, 2011.

Samsung, "UL HARQ-ACK Multiplexing: Mapping for 4 Bits" 3GPP TSG RAN WG1 #61bis. Dresden, Germany, Jun. 28-Jul. 2, 2010.

$3^{rd}$ Generation Partnership Project, Technical Specification Group Radio Access Network, "Evolved Universal Terrestrial Radio Access (E-UTRA); Physical Channels and Modulation" Release 9, 3GPP TS 36.211. V9.1.0, Mar. 2010.

$3^{rd}$ Generation Partnership Project, Technical Specification Group Radio Access Network, "Evolved Universal Terrestrial Radio Access (E-UTRA); Physical Layer Procedures" Release 9, 3GPP TS 36.213, V9.1.0, Mar. 2010.

* cited by examiner

ARRANGEMENT AND METHOD FOR IMPROVING HARQ FEEDBACK IN TELECOMMUNICATION SYSTEMS

CROSS-REFERENCE TO RELATED APPLICATIONS

This application is a continuation of U.S. patent application Ser. No. 13/779,340, filed on Feb. 27, 2013, issued as U.S. Pat. No. 8,737,342 on May 24, 2014, which is a continuation of U.S. patent application Ser. No. 13/196,630, filed on Aug. 2, 2011, now abandoned, which is a continuation of International Application No. PCT/CN2011/075380, filed on Jun. 7, 2011, which claims priority to U.S. Patent Application No. 61/373,399, filed on Aug. 13, 2010, all of which are hereby incorporated by reference in their entireties.

FIELD

The present application relates to a method and an arrangement in telecommunication systems, and in particular to an arrangement and a method for improving Hybrid Automatic Repeat Request, HARQ, feedback in a telecommunication system.

BACKGROUND

The 3rd Generation Partnership Project (3GPP) is a collaboration agreement that brings together a number of telecommunications standards bodies. Within the 3GPP workgroups a new system concept denoted Long Term Evolution (LTE) and System Architecture Evolution (SAE) are being standardized. The architecture of the 3GPP LTE/SAE system (denoted LTE here after), which is schematically illustrated in FIG. 1, is flat compared to e.g. GSM (Global System for Mobile communications) and WCDMA (Wideband Code Division Multiple Access) based systems. FIG. 1 shows that the LTE radio base stations 100a, 100b, 100c (denoted eNodeBs, or eNBs, in 3GPP terminology) are directly connected to the core network nodes 101a, 101b MME/S-GWs (mobility management entity/serving gateway) via the S1 interfaces 102a, 102b, 102c, 102d. The S1 interface supports a many-to-many relation between MMEs/Serving Gateways and eNBs. There is no central radio network controller in the Evolved UMTS Terrestrial Radio Access Network (E-UTRAN). Instead the eNBs are connected to each other via the direct logical X2 interfaces 103a, 103b, 103c. A mobile phone being operated in such a system is an example of a user equipment denoted UE (not shown in FIG. 1).

In such systems, one example being, LTE-Advanced, multiple component carriers are aggregated in uplink and downlink, respectively. For example, to provide high data rates, the UE is configured to receive simultaneous transmissions on multiple downlink component carriers. For one UE, each component carrier is used for transmission of one transport block (two transport blocks in the presence of Multiple Input and Multiple Output, MIMO, systems). To receive such a transport block the UE must first detect that a block is incoming, more on this below. If the detection of a transport block is successful, the UE is configured to send an acknowledged message, an ACK, on the uplink and if the detection was unsuccessful, the UE is configured to send a not-acknowledged message, a NACK. Thus, with carrier aggregation, multiple ACK or NACK bits need to be transmitted from a UE in response to the transmitted transport block over different component carriers.

In the LTE standard, both the terms component carrier and cell exist. The term component carrier is related to a carrier frequency which is a term typically used when arranging measurements, and UEs then report cells on that carrier frequency. The term cell is used for many other instances, such as mobility, which refers to a change of serving cell. A cell may include both an uplink and a downlink direction of communication. For example, a UE can be assumed to have a Primary Serving Cell (PCell). In the DL, the carrier corresponding to the PCell is the DL Primary Component Carrier (PCC) while in the UL it is the UL PCC. Similarly, Secondary Serving Cell (SCell) may be configured together with the PCell. In the DL, the carrier corresponding to the SCell is the DL Secondary Component Carrier (SCC) while in the UL it is the UL SCC. Hence, carrier aggregation can equivalently be expressed as the aggregation of serving cells. In this document, we assume the notion of carrier aggregation by means of component carriers, but a person skilled in the art could equivalently use the terminology of cells instead of component carriers in relation to carrier aggregation and transmission.

As stated above, the UE needs to detect a downlink control channel before detecting the transport block. Such a downlink control channel contains the downlink assignment information needed to receive the data channel and to decode the transport block. If the UE does not correctly receive the control channel, the UE is not aware of that it is expected to receive any data channel and it does not send any ACK or NACK on the uplink. This is referred to as discontinuous transmission (DTX). The eNB knows when to expect a NACK or ACK and the eNB would have to initiate a retransmission upon DTX detection.

Furthermore the ACK/NACK signalling in the uplink may be erroneous. For example a transmitted ACK may be received as a NACK, or a transmitted NACK may be received as an ACK. Such a NACK-to-ACK (or ACK-to-NACK) error may introduce HARQ buffer corruption due to an erroneous combination of several transmissions. An ACK-to-NACK error leads to inefficient system operation due to unnecessary retransmissions. It is therefore important to provide robust ACK/NACK signalling. To assure proper system performance, the LTE specifications list requirements on the ACK/NACK error performance.

Channel selection is one method that is capable for transmission of multiple ACK and NACK bits. The transmission is performed by Quadrature Phase-Shift-Keying, QPSK, modulated sequences and the ACK/NACK information is encoded by both the selection of the channel, in the form of sequence, and the QPSK constellation point, i.e., the modulation symbol. The channel selection refers to the selection of the sequence and several channels can be transmitted on the same frequency resource. That is, channels are obtained by Code Division Multiplexing, CDM, of sequences. Since only one sequence is selected and transmitted for one UE, channel selection preserves the single-carrier property of the signal. This ACK/NACK feedback principle was used already in LTE Rel-8 for Time Division Duplex, TDD, where ACK/NACKs from multiple downlink subframes are signalled by one transmission in a single uplink subframe. This is in the standard referred to as transmission of ACK/NACK multiplexing. For LTE-Advanced, channel selection will also be used, but in the context of conveying ACK/NACKs from multiple component carriers. This applies for UEs with maximum capability of four ACK/NACK bits and also includes the Frequency Division Duplex, FDD, case. Each transport block generally requires one ACK/NACK bit, thus four ACK/

NACK bits could, e.g., correspond to a configuration of two component carriers with MIMO transmission on each carrier.

To encode the ACK/NACK/DTX information, a mapping is needed between the different states of ACK, NACK and DTX and the channels and QPSK constellation points. This can also be referred to as an ACK/NACK codebook. These tables exist in the standard for channel selection for TDD in Rel-8, but new mappings (i.e. codebooks) are needed for carrier aggregation in LTE-Advanced because of a different resource reservation, i.e., the determination of the channels will be different. Transmission of ACK/NACKs for carrier aggregation by means of channel selection requires a codebook where for each valid combination of ACK/NACK/DTX, one channel and one constellation point should be assigned. The codebook design impacts the ACK-to-NACK and NACK-to-ACK error probabilities.

Thus, an alternative manner of providing a codebook leading to an improved HARQ feedback would be useful.

SUMMARY

By realizing that it is undesirable to have different error performance for different ACK/NACK bits, e.g., among transport blocks on different component carriers, or between transport blocks within a component carrier with MIMO as the performance requirements for the error probabilities would also have to be set according to the worst performing ACK/NACK bit, there is no use in constructing a codebook which gives one, or a few, ACK/NACK bits significantly better performance.

On this background, it would be advantageous to provide an apparatus, a computer program stored on a storage medium and a method that overcomes, or at least reduces, the drawbacks indicated above by providing an apparatus configured to operate in a telecommunications network, said apparatus comprising a controller or processor configured to encode a plurality of uplink feedback information elements for carrier aggregation, by a set of codewords where each codeword comprises a channel, wherein at least two information elements have the same channel distribution.

Such an apparatus is able to provide an error performance being substantially equal among the ACK/NACK bits.

In one embodiment a codebook comprises any combination of ACK and NACK.

In one embodiment a codebook comprises any combination of ACK and NACK and DTX.

In one embodiment a codebook comprises any combination of ACK and NACK/DTX.

The aspects of the disclosed embodiments are also directed to providing a method for execution on an apparatus configured to operate in a telecommunications network comprising a processor, wherein said processor is configured to execute said method, said method comprising encoding a plurality of uplink feedback information elements for carrier aggregation, by a set of codewords where each codeword comprises a channel, wherein at least two information elements have the same channel distribution.

The aspects of the disclosed embodiments are also directed to providing a computer readable medium including at least computer program code for controlling an apparatus configured to operate in a telecommunications network, said computer readable medium comprising software code for encoding a plurality of uplink feedback information elements for carrier aggregation, by a set of codewords where each codeword comprises a channel, wherein at least two information elements have the same channel distribution.

The aspects of the disclosed embodiments are also directed to providing a second apparatus configured to receive feedback information elements generated by a method or apparatus according to above.

In one embodiment such a second apparatus is a base station.

Further objects, features, advantages and properties of device, method and computer readable medium according to the present application will become apparent from the detailed description.

BRIEF DESCRIPTION OF THE DRAWINGS

In the following detailed portion of the present description, the teachings of the present application will be explained in more detail with reference to the example embodiments shown in the drawings, in which.

DETAILED DESCRIPTION

In the following detailed description, the apparatus, the method and the software product according to the teachings of this application will be described by the embodiments. It should be noted that although only a mobile phone, a base station and a server are described the teachings of this application can also be used in any electronic device operating in a telecommunications network such as portable electronic devices such as media players, game consoles, laptops, Personal Digital Assistants, electronic books and notepads.

In the prior art system of table 1 the system is designed for carrier aggregation in FDD with four ACK/NACK bits (enumerated as HARQ-ACK(0) to HARQ-ACK(3)). In this document, we may interchangeably refer to ACK/NACK bits as uplink information feedback elements. This is the system being described in Samsung, "UL HARQ-ACK multiplexing mapping for 4 bits", R1-103638.

Figure 1:
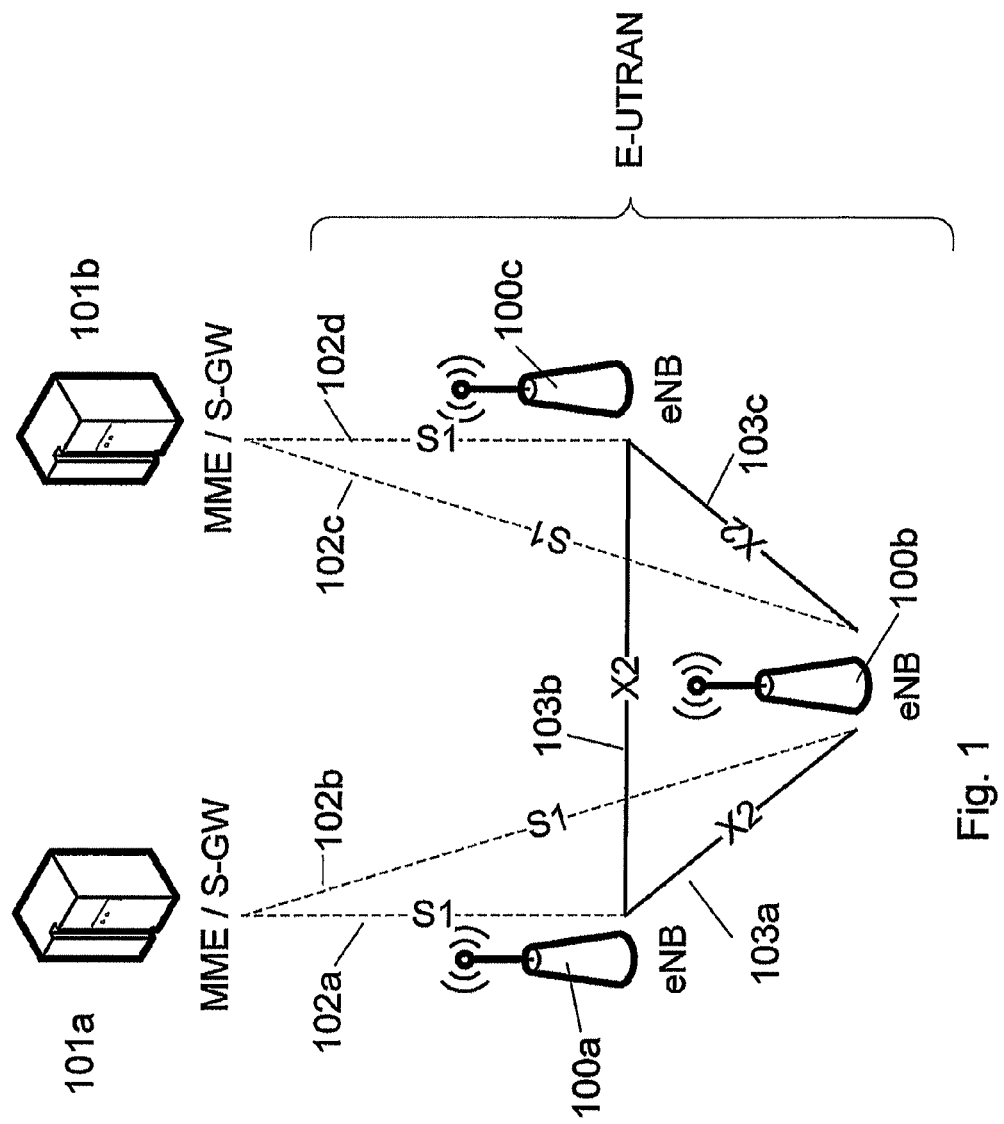
FIG. 1 is an overview of a telecommunications system in which an arrangement according to the present application is used according to an embodiment.
Figure 2:
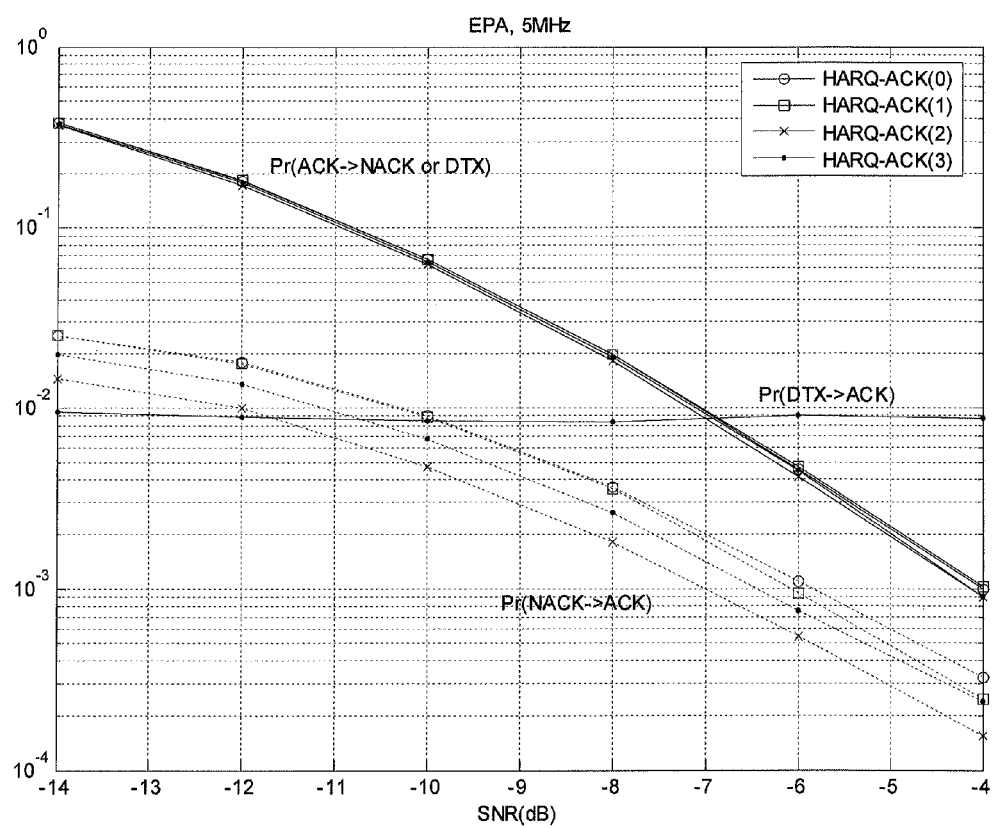
FIG. 2 is a schematic view of error probabilities for different feedback bits according to signal to noise ratio according to a prior art system.

For this system the error probabilities differ among the different ACK/NACK bits. This is especially pronounced for the NACK-to-ACK error curves, where the HARQ-ACK(2) bit is significantly better than the others. Hence, this prior art codebook exhibits substantial differences in error performance among ACK/NACK bits, which is undesirable, see FIG. 2. FIG. 2 shows simulation results for the ACK/NACK detection error probabilities for each ACK/NACK bit, using the codebook of Table 1. It is clear from FIG. 2 that especially for NACK→ACK the error probabilities for the different bits are very different (see the curves marked Pr(NACK→ACK)).

The channels used for transmission need to be unique for each UE. The assignment of a channel to a UE is sometimes referred to as resource reservation. In LTE TDD, the channels are implicitly determined from the time-frequency position of the control channels containing the downlink assignments that are associated with the shared data channels transmitting the transport blocks in the different downlink subframes.

Implicit resource reservation schemes can also be considered for channel selection for carrier aggregation. That is for aggregation of two component carriers, channels $n_{PUCCH}(0)$, $n_{PUCCH}(1)$ (PUCCH—Physical Uplink Control Channel) is determined from a downlink control channel on a first component carrier, and channels $n_{PUCCH}(2)$, $n_{PUCCH}(3)$ are determined from a downlink control channel on a second component carrier. However, considering entry number 14 in table 1 which represents (NACK/DTX, NACK/DTX, ACK, ACK) by transmission on channel $n_{PUCCH}(0)$, the DTX states imply that the downlink control channel on the first component carrier was not correctly received. In this case, the channel $n_{PUCCH}(0)$ is not known to the UE, since it would be implicitly obtained from the missed downlink control channel. Hence, the proposed codebook may not be suitable for implicit resource reservation.

Therefore, this application teaches to use at least two HARQ acknowledgements, such as uplink feedback information elements, in carrier aggregation. Such a carrier aggregation using selection of a channel and modulation symbol, comprised in a codeword, for encoding ACK/NACK/DTX information, where the mapping relation between codewords and the ACK/NACK/DTX combination forms a codebook which includes one or several of the following features:

i) at least two ACK/NACK bits have the same channel distribution.

ii) at least two ACK/NACK bits have the same constellation distribution.

iii) for a given channel and ACK/NACK bit, ACKs (or NACKs) are encoded by using constellation points that are as closely located as possible.

In one embodiment all information elements have the same channel distribution.

In one embodiment all information elements have the same modulation symbol distribution.

Figure 3:
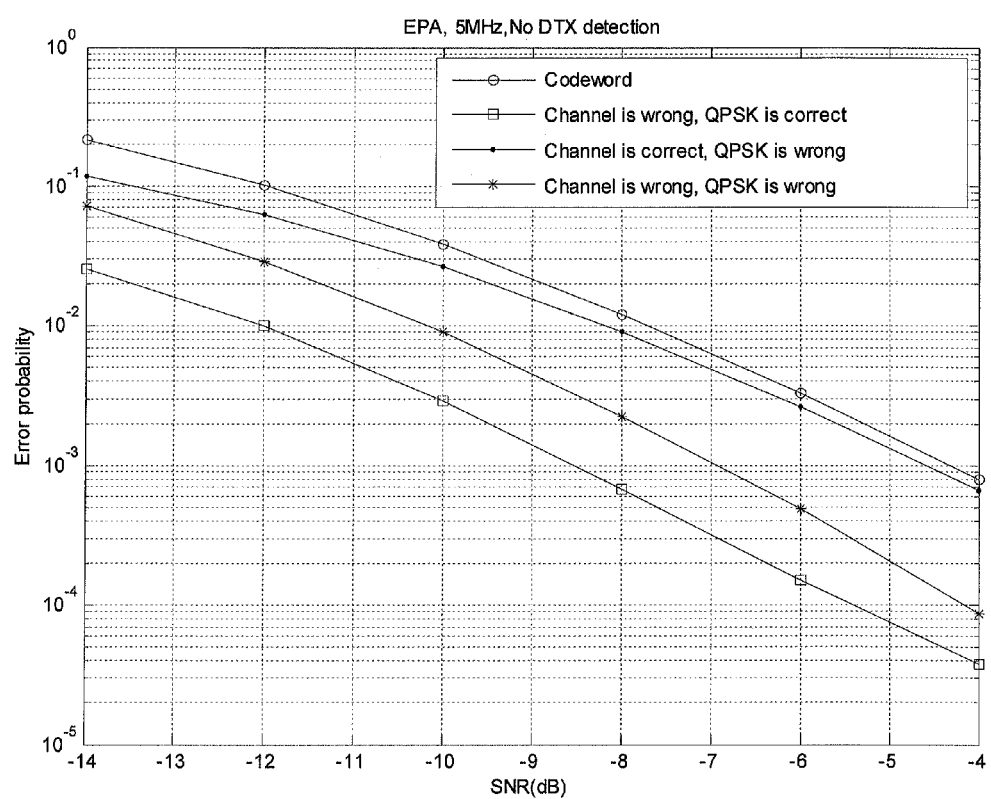
FIG. 3 is a schematic view of error probabilities for different error sources according to signal to noise ratio.

A reason for the differing error performance of the prior art system shown in FIG. 2 stems from that the detection of the channel is often more reliable than the detection of the QPSK constellation symbol. For a prior art system the detection performance of channel and modulation symbol in terms of codeword error probability is shown in FIG. 3. A codeword is defined as the concatenation of the channel and the bits of the QPSK symbol ([$n_{PUCCH}$, QPSK]). More precisely $b(0)$ and $b(1)$ denote the bits, taking value 0 or value 1, that are conveyed by the complex-valued QPSK modulation symbol. For transmission of a codeword, the UE shall transmit bits $b(0)$ and $b(1)$ on ACK/NACK resource $n_{PUCCH}$. This means that the QPSK symbol, comprising $b(0)$ and $b(1)$, should modulate the sequence corresponding to $n_{PUCCH}$. If at least one element of codeword (either channel or QPSK symbol) is not correct, the codeword will be assumed to be an error. The performance of the codeword is dominated by the instance when the case channel is correct and QPSK symbol is wrong, and the error probability of other cases related to wrong channel is marginal. Hence the detection of the channel is more reliable than that of QPSK symbol. The assignment of codewords to ACK/NACK/DTX states therefore becomes crucial to the performance.

A codeword consists of a channel and a QPSK constellation symbol (or the bits $b(0)$ and $b(1)$ of the constellation symbol), more on this below. Thus an error may occur in either one or both of these. Thus, there are two main features which can be used for improving the codebook. One is to focus on the constellation points of the QPSK and the other is to focus on the channel distribution.

Focusing on the constellation points, the inventors have realized that an ACK or NACK error may occur when an erroneous or wrong constellation point is detected, when the channel is correctly detected. According to the teachings herein the constellation points are chosen such that constellation points that are closely located should represent the same information. This provides the possibility that even if a codeword is erroneously detected there might not be an error. By grouping the constellation points in this manner the teachings herein require that the detection error is substantial before an error in ACK/NACK is detected.

In one embodiment, using Gray coded QPSK, closely located point pairs are (00, 01), (01, 00), (01, 11) and (10, 11) and should represent the same information. And (00, 11) and (01, 10) are remotely located and should NOT represent the same information. In one example 00 and 01 represents ACK and 10 and 11 represents NACK.

The term 'closest located' is to be interpreted as a Euclidean distance when the constellation points are equiprobable, i.e. equally likely.

In one embodiment a controller or processor is configured to use table 2 as a codebook.

In one example where the first bit, HARQ-ACK(0) is ACK the following codewords are eligible: [2,0,1], [1,1,0], [3,1,1], [0,0,0], [0,0,1], [2,1,0], [2,1,1], [1,1,1] using the notation [$n_{PUCCH}$,QPSK], QPSK being of the form $b(0)$, $b(1)$ ($b(0)$ is one of 0,1 and $b(1)$ is one of 0, 1).

For example, for the given channel '0', if the correct codeword is [0, 0, 0] but [0, 0, 1] is detected, the state of HARQ-ACK(0) is still an ACK and no error occurs for the bit HARQ-ACK(0). Given that the channel '0' is correctly detected, an error only occurs if QPSK symbol '00' is detected as '10' or '11' (or '01' is detected as '10' or '11'). For channel '0', the two constellation points ('00' and '01') are the closest possible and represent the same information (i.e. ACK) for HARQ-ACK(0). It can also be seen that for channel '1', the QPSK symbols representing an ACK are the closest possible, i.e., '10' and '11'. Furthermore, channel '3' occurs three times in the above listing and thus any three QPSK constellation points will be located next to each other. It is clear from Table 2 that this principle of mapping the constellation points applies to any HARQ-ACK bit, for any state ACK or NACK/DTX. Hence, equal detection performance is provided by the codebook of Table 2.

In the prior art solution Table 1, it can be found that the above property does not hold. For example, consider HARQ-ACK(1) and entry number 5 and 16, where $n_{PUCCH}(3)$ is used to encode NACK and NACK/DTX. The QPSK bits are in entry number 5 equal to '01' and in entry number 16 equal to '10'. The corresponding QPSK symbols encoding a NACK are thus not the closest possible.

Since the detection probabilities of the channel and QPSK symbols may be different, the distribution of the channels for encoding the ACK or NACKs is of relevance for achieving equal error performance among ACK/NACK bits. Channel distribution will be more precisely described below and refers to the distribution of the number of codewords comprising a certain channel for a given ACK/NACK bit. The impact of the channel distribution is evident as shown in the following two cases.

Case I: Correctly Detected Channel

If a processor has correctly detected a channel, an error can only occur due to symbol error. In one embodiment the processor is configured to use Gray coded QPSK. In this embodiment, for an AWGN channel, the symbol error probabilities are obtained from the following expressions;

No symbol error: $Pr['00' \to '00'] = (1-p)^2$
Closest symbol detected: $Pr['00' \to '01'] = p(1-p)$
Closest symbol detected: $P['00' \to '10'] = p(1-p)$
Farthest symbol detected: $Pr['00' \to '11'] = p^2$
where $p = Q(\sqrt{SNR})$ (SNR=Signal to Noise Ratio).

When the channel is correctly detected, the error probability of a NACK (or ACK) for a channel being contained in n codewords that encode a NACK (or ACK) bit becomes:

| n | Error probability |
|---|---|
| 1 | $1 - (1-p)^2 = 2p - p^2$ |
| 2 | $p^2 + p(1-p) = p$ |
| 3 | $1/3 \cdot p^2 + 2/3 \cdot p(1-p)$ |
| 4 | 0 |

Figure 4:
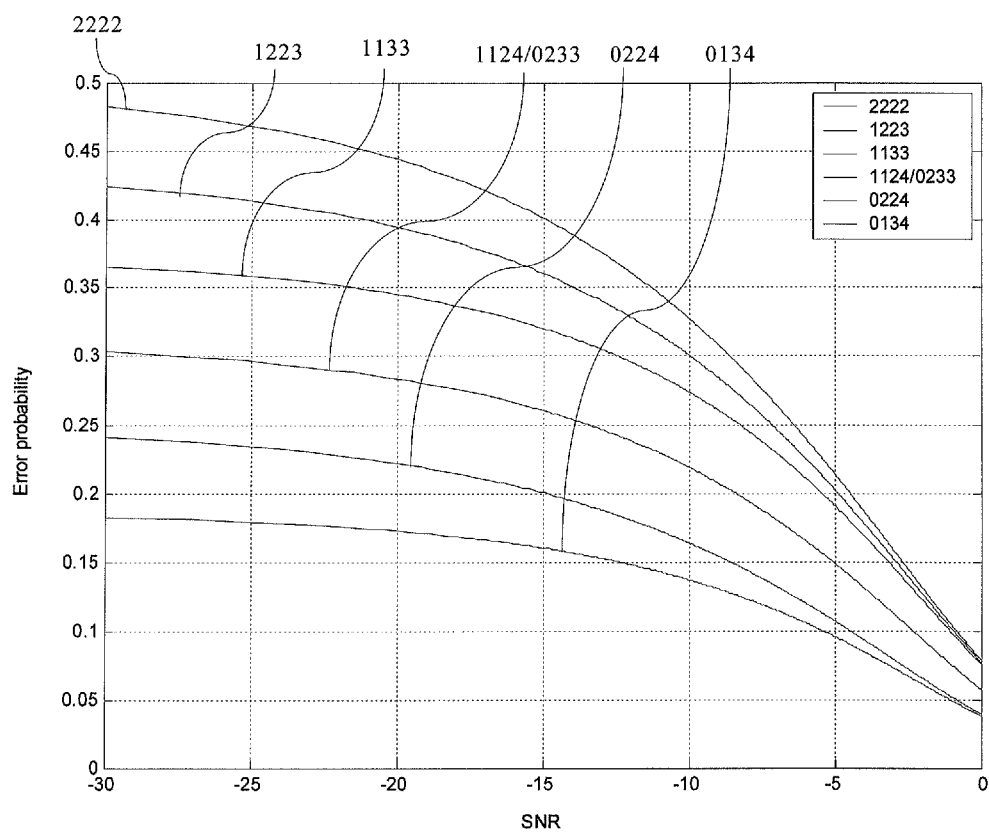
FIG. 4 is a schematic view of error probabilities for different channel distribution according to signal to noise ratio.

For the situation with more than one channel, the notation $n_i^{(j)}$ as the number of codewords including channel i for encoding a NACK for a given bit HARQ-ACK(j) is used. See Table 3 which gives the error probabilities for different channel distribution. Table 3 has been constructed by taking the error probabilities above and multiplying with the respective conditional probability of usage of the codeword. Table 3 is related to NACKs but the same teaching also applies to ACKs. FIG. 4 shows the corresponding plots for the probabilities. Each line denoted by the set [nnnn] represents the channel distribution.

Case II: Incorrectly Detected Channel

When a processor has detected a channel erroneously, a phase error will remain since the sequence (i.e., the channel) is not correctly detected. The processor is therefore configured to assume that the detected QPSK constellation point is random and there is about equal probability for any QPSK symbol. Any codeword that does not include the correct channel is therefore equally probable. For a given ACK/NACK bit, a NACK-to-ACK error will then occur if the decoded codeword represents ACK and does not include the correct channel. For a given channel distribution, the error probability is expressed as:

The prior art codebook of Table 1 gives the following channel distributions for the NACK or NACK/DTX states.

| HARQ-ACK (j) | $n_0^{(j)}$ | $n_1^{(j)}$ | $n_2^{(j)}$ | $n_3^{(j)}$ |
|---|---|---|---|---|
| j = 0 | 1 | 3 | 3 | 1 |
| j = 1 | 4 | 1 | 1 | 2 |
| j = 2 | 2 | 4 | 0 | 2 |
| j = 3 | 2 | 3 | 3 | 0 |

In this prior art example multiple channel distributions are used for different HARQ-ACK bit, which is the reason for the unequal error performance. This is in fact the worst case scenario, since every bit j is encoded by a different channel distribution.

According to the teachings herein a codebook is provided wherein at least two ACK/NACK bits has the same channel distribution. It is clear from Table 3 and 4 that the error probability for a given distribution is independent on the order of the elements. Thus, the teaching of this application provide a solution where the same channel distribution for two ACK/NACK bits is defined as having the same set of values $\{n_i^{(j)}\}$, but not considering the order of the elements in this set. The table below contains the channel distributions for the codebook of Table 2. It is clear from the table below that all ACK/NACK bits j have the same channel distribution, i.e., the same set of values.

| HARQ-ACK (j) | $n_0^{(j)}$ | $n_1^{(j)}$ | $n_2^{(j)}$ | $n_3^{(j)}$ |
|---|---|---|---|---|
| j = 0 | 2 | 2 | 1 | 3 |
| j = 1 | 1 | 2 | 2 | 3 |
| j = 2 | 2 | 3 | 1 | 2 |
| j = 3 | 2 | 3 | 2 | 1 |

The constellation distribution also has an impact on the performance and may cause different performance for different channels. Using the notation $m_i^{(j)}$ as the number of codewords for which constellation point i is utilized for encoding a NACK for a given bit HARQ-ACK(j). The prior art solution of table 1 results in a constellation distribution for NACK and NACK/DTX shown below, where it is assumed that:

$$Pr[NACK \to ACK \mid \text{incorrect channel detection}] \approx \sum_{i=0}^{3} Pr[\text{Transmitted codeword represents } NACK \text{ and uses channel } i] \times$$

$$Pr[\text{Detected codeword represents } ACK \text{ and does not use channel } i]$$

$$= \sum_{i=0}^{3} \frac{n_i^{(j)}}{8} \frac{(8 - (4 - n_i^{(j)}))}{12}$$

Table 4 shows the error probabilities for the different channel distributions.

Thus, in both Case I and Case II the NACK-to-ACK or ACK-to-NACK error performance is highly dependent on the channel distribution.

As can be seen from FIG. 3, the detection performance of a channel is more reliable than the detection of a QPSK modulation symbol and the performance of NACK-to-ACK or ACK-to-NACK is mainly determined by Case I, i.e. when the channel is correctly detected. Hence the channel distribution of different HARQ-ACK bit as analyzed in Table 3 will dominate the performance of different HARQ-ACK bit.

The inventors have realized that the reason for the unequal performance is a result of that multiple channel distributions are used for different HARQ-ACK bits.

i=0 ⇔ '00'
i=1 ⇔ '01'
i=2 ⇔ '10'
i=3 ⇔ '11'

| HARQ-ACK (j) | $m_0^{(j)}$ | $m_1^{(j)}$ | $m_2^{(j)}$ | $m_3^{(j)}$ |
|---|---|---|---|---|
| j = 0 | 2 | 2 | 4 | 0 |
| j = 1 | 2 | 2 | 3 | 1 |
| j = 2 | 3 | 2 | 2 | 1 |
| j = 3 | 2 | 1 | 2 | 3 |

The inventors have realized that two different constellation distributions are used and that for j=0 the QPSK symbol '11' is not used at all. This asymmetry leads to an uneven performance.

To overcome this, the teachings herein provide the codebook of table 2 which has a single constellation distribution for NACK and NACK/DTX as shown below.

| HARQ-ACK (j) | $m_0^{(j)}$ | $m_1^{(j)}$ | $m_2^{(j)}$ | $m_3^{(j)}$ |
|---|---|---|---|---|
| j = 0 | 3 | 2 | 2 | 1 |
| j = 1 | 1 | 3 | 2 | 2 |
| j = 2 | 2 | 1 | 2 | 3 |
| j = 3 | 2 | 2 | 3 | 1 |

Figure 5:
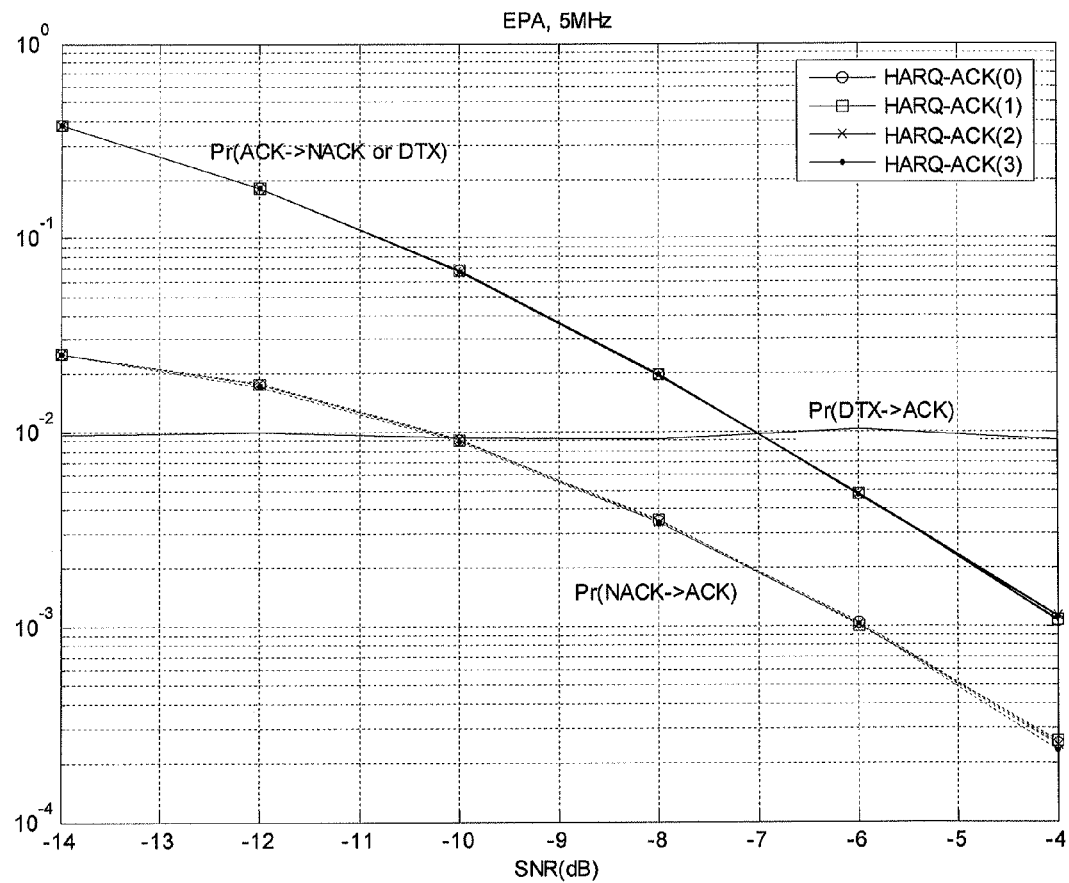
FIG. 5 is a schematic view of error probabilities for different feedback bits according to signal to noise ratio according to an embodiment.

FIG. 5 shows the performance of an arrangement using the codebook of table 2. As can be seen the performance of the different feedback information elements are much more equal thus giving a more desired performance. Compare for example the error probabilities for NACK→ACK of FIG. 2 and FIG. 5 (the curves marked Pr(NACK→ACK)). This is due to that there is the same channel and constellation distribution for different HARQ-ACK bit of the proposed codebook, they have equal performance for different HARQ-ACK.

It should be noted that the teachings above are also applicable to using more than four ACK/NACK bits.

It should be noted that the teachings above are also applicable to using less than four ACK/NACK bits.

In one embodiment a processor is configured to implement a codebook as outlined above for three ACK/NACK bits. In one embodiment the codebook would comprise one component carrier supporting MIMO and one component carrier without MIMO. Such a codebook can support 12 states when three channels are reserved and using QPSK modulation. One example of such a codebook is given in Table 5, where HARQ-ACK(0) and HARQ-ACK(1) represent ACK/NACK bits on a first component carrier supporting MIMO and HARQ-ACK(2) represent an ACK/NACK bit on a second component carrier or channel with SIMO.

In one embodiment a controller or processor is configured to use table 5 as a codebook.

Table 6 shows a codebook according to another embodiment. This codebook has three bits wherein two channels are reserved. This codebook supports eight states.

In one embodiment a controller or processor is configured to use table 6 as a codebook.

According to an embodiment, a codebook for N information elements (i.e. HARQ-ACK) feedback can be obtained such as codebook for HARQ-ACK multiplexing with four bits in Table 2, in which at least two information elements have the same channel distribution. When this codebook is used, a corresponding codeword from this codebook will be feed back according to the state of N information elements. In some cases, N1 (N1<N) information elements need to be transmitted and a codebook for N1 information elements is needed. In order to avoid the complexity of designing a new codebook for N1 bits HARQ-ACK and less storage, the new codebook for N1 information elements can be derived from the defined codebook for N information elements. The following are example embodiments of the above.

In one embodiment two component carriers are configured to support MIMO transmission with two transport blocks, and there are four HARQ-ACK bits (HARQ-ACK(0), HARQ-ACK(1), HARQ-ACK(2) and HARQ-ACK(3)) in response to the MIMO transmission at these two component carriers. HARQ-ACK(0) and HARQ-ACK(1) respond to the two transport blocks at the first component carrier and the remaining two HARQ-ACK bits are for the two transport blocks of the second component carrier. The codebook for such 4 bits HARQ-ACK multiplexing is shown in Table 7 designed according to the disclosure, and the corresponding channel distribution is shown below.

| HARQ-ACK (j) | $n_0^{(j)}$ | $n_1^{(j)}$ | $n_2^{(j)}$ | $n_3^{(j)}$ |
|---|---|---|---|---|
| j = 0 | 2 | 1 | 3 | 2 |
| j = 1 | 1 | 2 | 3 | 2 |
| j = 2 | 1 | 2 | 1 | 4 |
| j = 3 | 2 | 4 | 2 | 0 |

From the channel distribution, it can be seen that the first two HARQ-ACK bits have the same channel distribution.

For the two component carriers, when one of them is configured to support MIMO transmission with two transport blocks and the other one is non-MIMO transmission with single transport block, three HARQ-ACK bits (HARQ-ACK(0), HARQ-ACK(1) and HARQ-ACK(2)) are needed. The codebook for the three bits HARQ-ACK mapping can be derived from the 4 bits codebook (Table 7) by using HARQ-ACK(0), HARQ-ACK(1) and HARQ-ACK(3), and deleting rows 3, 7, 12 and 16. The constructed new codebook is illustrated in Table 8.

Another embodiment is, there is the same assumption as the above embodiment, where two component carriers support MIMO transmission with two transport blocks each and there are four corresponding HARQ-ACK bits using codebook as Table 7.

During the transmission, it may occur that two transport blocks transmission at a certain component carrier fall back to single transport block transmission due to blanking HARQ, e.g. it falls back to single transport block transmission on the second component carrier. For this case, the state of three HARQ-ACK bits needs to be transmitted.

When transmitting the state of three HARQ-ACK bits, it can reuse the codeword of four bits codebook and a new codebook is not needed. The relation between the state of three HARQ-ACK bits and the codeword in codebook Table 7 is [HARQ-ACK(0), HARQ-ACK(1), HARQ-ACK(2), X], where X depends on HARQ-ACK(2). When HARQ-ACK(2) is ACK or NACK, X is ACK; otherwise X is NACK/DTX. According to the state of the three bits, there will be one corresponding codeword from the defined codebook. For example, when HARQ-ACK(0)=NACK, HARQ-ACK(1)=NACK and HARQ-ACK(2)=DTX, the corresponding codeword will be entry number 10, i.e. [NACK/DTX, NACK/DTX, NACK/DTX, NACK/DTX]. As eNB knows that there are only three HARQ-ACK bits, it can derive that the state of the three bits is [NACK, NACK, DTX] when the entry number 10 is detected. In this case, some codewords are invalid, e.g. [ACK, ACK, ACK, NACK].

The inventors have also realized that table 1 represents an aggregation of two component carriers, each component carrier supporting MIMO transmission. Table 2 represents a codebook also having an aggregation of two component carriers. This follows from that HARQ-ACK(0) and HARQ-ACK(1) (or HARQ-ACK(2) and HARQ-ACK(3)) must be in DTX simultaneously, as encoded by entry numbers 10, 14, 15 and 16 (or 4, 8, 10, 13).

In one embodiment, see Table 9, a codebook is provided which allows independent states of DTX among the HARQ-ACK(j) items representing different component carriers.

Such a general codebook is obtained by only considering the two states ACK and NACK/DTX. Table 9 is constructed by replacing NACK with NACK/DTX in Table 2.

Table 9 represents a codebook with four component carriers and no MIMO. This provides four ACK/NACK bits, providing the advantage that DTX is independent among the j=0, 1, 2, 3 states, where HARQ-ACK(j) is the feedback for component carrier j.

It is thus clear that the teachings herein can be applied to provide any codebook and the teachings are not dependant on the number of carriers.

Table 2 can be derived from Table 9. A person skilled in the art could easily identify the NACK/DTX states that would not be eligible if two component carriers with MIMO is assumed, for which Table 9 would reduce to Table 2. Similarly, a codebook for the case of aggregating two component carriers without MIMO with one component carrier with MIMO could be deduced from the general Table 9 by replacing non-applicable combinations of NACK/DTX with NACK or DTX, respectively.

In Table 2, there are 16 unique codewords and each codeword corresponds to exactly one entry number, i.e., one information state. However, in one embodiment one codeword corresponds to more than one entry number. Such a codebook thus allows for more information states to be fed back. In such an embodiment a receiver is configured to decide on which is the most suitable interpretation of the codeword in terms of information state.

In for example LTE Rel-8, there are more entries in the table than codewords, so a codeword may represent multiple information entities and it would be up to the eNB to decide how to interpret such a codeword.

Figure 6:
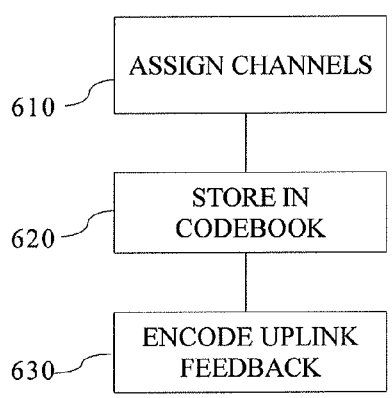
FIG. 6 is a flow chart describing a method according to an embodiment.

The teachings herein thus disclose a method for encoding uplink information elements as is shown in FIG. 6, where a channel distribution is effected, wherein at least two information elements share a channel, 610. The channel distribution is stored in a codebook 620 and used for encoding an uplink feedback 630.

Figure 7:
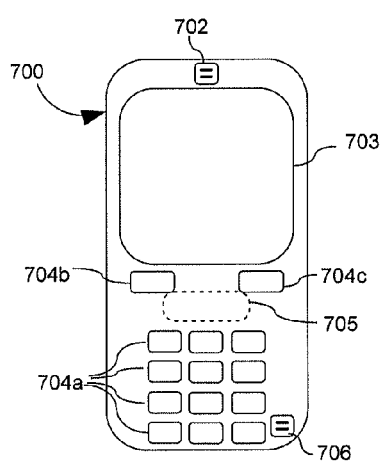
FIG. 7 is a schematic view of an apparatus according to an embodiment.

FIG. 7 shows a schematic view of an example apparatus in or user equipment in the form of a mobile phone. The mobile phone 700 has a loudspeaker 702 for outputting sound and a display 703 for outputting graphics. In one embodiment the display 703 is a touchscreen. The mobile phone 700 also has a set of keys 704 which in this example embodiment consist of two softkeys 704b and 704c and a number of text/number input keys 704a. The phone also has a microphone 706 for inputting voice commands or sounds.

The mobile phone 700 is further arranged with internal circuitry 705 shown with a dashed rectangle in FIG. 7. The internal circuitry 705 comprises a processor and a memory for storing executable program code, instructions, data and drivers for various accessories, such as Global Positioning System devices, pulse monitors, displays and media players for example.

It should be noted that even though the description herein have focused on EUTRAN and 3GPP networks the teachings herein also find use in other networks with HARQ feedback. In fact, the teachings herein find use in any system with multiple carriers which signals control information in the uplink.

The various aspects of what is described above can be used alone or in various combinations. The teaching of this application may be implemented by a combination of hardware and software, but can also be implemented in hardware or software.

The teaching of this application can also be embodied as computer readable code on a computer readable storage medium. Such storage mediums may be a random access memory, a read-only memory, a compact disc, a digital video disc, an EEPROM memory or other computer readable storage mediums.

Although the teaching of the present application has been described in detail for purpose of illustration, it is understood that such detail is solely for that purpose, and variations can be made therein by those skilled in the art without departing from the scope of the teaching of this application.

Features described in the preceding description may be used in combinations other than the combinations explicitly described.

The term "comprising" as used in the claims does not exclude other elements or steps. The term "a" or "an" as used in the claims does not exclude a plurality. A unit or other means may fulfill the functions of several units or means recited in the claims.

TABLES

TABLE 1

| Entry Number | HARQ-ACK (0), HARQ-ACK (1), HARQ-ACK (2), HARQ-ACK (3) | $n_{PUCCH}$ | QPSK |
|---|---|---|---|
| 1 | ACK, ACK, ACK, ACK | $n_{PUCCH}(3)$ | 1, 1 |
| 2 | ACK, ACK, ACK, NACK | $n_{PUCCH}(2)$ | 1, 1 |
| 3 | ACK, ACK, NACK, ACK | $n_{PUCCH}(3)$ | 0, 0 |
| 4 | ACK, ACK, NACK/DTX, NACK/DTX | $n_{PUCCH}(1)$ | 1, 1 |
| 5 | ACK, NACK, ACK, ACK | $n_{PUCCH}(3)$ | 0, 1 |
| 6 | ACK, NACK, ACK, NACK | $n_{PUCCH}(0)$ | 1, 1 |
| 7 | ACK, NACK, NACK, ACK | $n_{PUCCH}(0)$ | 0, 0 |
| 8 | ACK, NACK, NACK/DTX, NACK/DTX | $n_{PUCCH}(0)$ | 0, 1 |
| 9 | NACK, ACK, ACK, ACK | $n_{PUCCH}(2)$ | 0, 1 |
| 10 | NACK/DTX, NACK/DTX, NACK/DTX, NACK/DTX | $n_{PUCCH}(1)$ | 1, 0 |
| 11 | NACK, ACK, ACK, NACK | $n_{PUCCH}(2)$ | 1, 0 |
| 12 | NACK, ACK, NACK, ACK | $n_{PUCCH}(1)$ | 0, 1 |
| 13 | NACK, ACK, NACK/DTX, NACK/DTX | $n_{PUCCH}(1)$ | 0, 0 |
| 14 | NACK/DTX, NACK/DTX, ACK, ACK | $n_{PUCCH}(0)$ | 1, 0 |
| 15 | NACK/DTX, NACK/DTX, ACK, NACK | $n_{PUCCH}(2)$ | 0, 0 |
| 16 | NACK/DTX, NACK/DTX, NACK, ACK | $n_{PUCCH}(3)$ | 1, 0 |
| 17 | DTX, DTX, DTX, DTX | N/A | N/A |

TABLE 2

| Entry Number | HARQ-ACK (0), HARQ-ACK (1), HARQ-ACK (2), HARQ-ACK (3) | $n_{PUCCH}$ | QPSK |
|---|---|---|---|
| 1 | ACK, ACK, ACK, ACK | $n_{PUCCH}(2)$ | 0, 1 |
| 2 | ACK, ACK, ACK, NACK | $n_{PUCCH}(1)$ | 1, 0 |
| 3 | ACK, ACK, NACK, ACK | $n_{PUCCH}(3)$ | 1, 1 |
| 4 | ACK, ACK, NACK/DTX, NACK/DTX | $n_{PUCCH}(0)$ | 0, 0 |
| 5 | ACK, NACK, ACK, ACK | $n_{PUCCH}(0)$ | 0, 1 |
| 6 | ACK, NACK, ACK, NACK | $n_{PUCCH}(2)$ | 1, 0 |
| 7 | ACK, NACK, NACK, ACK | $n_{PUCCH}(2)$ | 1, 1 |
| 8 | ACK, NACK, NACK/DTX, NACK/DTX | $n_{PUCCH}(1)$ | 1, 1 |
| 9 | NACK, ACK, ACK, ACK | $n_{PUCCH}(0)$ | 1, 1 |
| 10 | NACK/DTX, NACK/DTX, NACK/DTX, NACK/DTX | $n_{PUCCH}(1)$ | 0, 1 |
| 11 | NACK, ACK, ACK, NACK | $n_{PUCCH}(2)$ | 0, 0 |
| 12 | NACK, ACK, NACK, ACK | $n_{PUCCH}(1)$ | 0, 0 |
| 13 | NACK, ACK, NACK/DTX, NACK/DTX | $n_{PUCCH}(0)$ | 1, 0 |
| 14 | NACK/DTX, NACK/DTX, ACK, ACK | $n_{PUCCH}(3)$ | 0, 0 |
| 15 | NACK/DTX, NACK/DTX, ACK, NACK | $n_{PUCCH}(3)$ | 0, 1 |
| 16 | NACK/DTX, NACK/DTX, NACK, ACK | $n_{PUCCH}(3)$ | 1, 0 |
| 17 | DTX, DTX, DTX, DTX | N/A | N/A |

TABLE 3

| $[n_0^{(j)} n_1^{(j)} n_2^{(j)} n_3^{(j)}]$ | Error probability |
|---|---|
| [2222] | $8/8 \cdot p$ |
| [1223] | $1/8 \cdot (2p - p^2) + 4/8 \cdot p + 3/8 \cdot (1/3 \cdot p^2 + 2/3 \cdot p \cdot (1 - p))$ |
| [1133] | $2/8 \cdot (2p - p^2) + 6/8 \cdot (1/3 \cdot p^2 + 2/3 \cdot p \cdot (1 - p))$ |
| [1124] | $2/8 \cdot (2p - p^2) + 2/8 \cdot p$ |
| [0233] | $2/8 \cdot p + 6/8 \cdot (1/3 \cdot p^2 + 2/3 \cdot p \cdot (1 - p))$ |
| [0224] | $4/8 \cdot p$ |
| [0134] | $1/8 \cdot (2p - p^2) + 3/8 \cdot (1/3 \cdot p^2 + 2/3 \cdot p \cdot (1 - p))$ |
| [0044] | 0 |

TABLE 4

| $[n_0^{(j)} n_1^{(j)} n_2^{(j)} n_3^{(j)}]$ | $\sum_{i=0}^{3} \frac{n_i^{(j)}}{8} \frac{(8 - (4 - n_i^{(j)}))}{12}$ |
|---|---|
| [2 2 2 2] | 48/96 |
| [1 2 2 3] | 50/96 |
| [1 1 3 3] | 52/96 |
| [1 1 2 4] | 54/96 |
| [0 2 3 3] | 54/96 |
| [0 2 2 4] | 56/96 |
| [0 1 3 4] | 58/96 |
| [0 0 4 4] | 64/96 |

TABLE 5

| Entry Number | HARQ-ACK (0), HARQ-ACK (1), HARQ-ACK (2) | $n_{PUCCH}$ | QPSK |
|---|---|---|---|
| 1 | ACK, ACK, ACK, | $n_{PUCCH}(2)$ | 1, 1 |
| 2 | ACK, ACK, NACK | $n_{PUCCH}(2)$ | 1, 0 |
| 3 | ACK, ACK, DTX | $n_{PUCCH}(0)$ | 0, 0 |
| 4 | ACK, NACK, ACK | $n_{PUCCH}(1)$ | 0, 0 |
| 5 | ACK, NACK, NACK | $n_{PUCCH}(0)$ | 1, 1 |
| 6 | ACK, NACK, DTX | $n_{PUCCH}(1)$ | 0, 1 |
| 7 | NACK, ACK, ACK | $n_{PUCCH}(0)$ | 0, 1 |
| 8 | NACK, ACK, NACK | $n_{PUCCH}(1)$ | 1, 0 |
| 9 | NACK, ACK, DTX | $n_{PUCCH}(1)$ | 1, 1 |
| 10 | NACK/DTX, NACK/DTX, ACK | $n_{PUCCH}(2)$ | 0, 1 |
| 11 | NACK/DTX, NACK/DTX, NACK | $n_{PUCCH}(2)$ | 0, 0 |
| 12 | NACK/DTX, NACK/DTX, DTX | $n_{PUCCH}(0)$ | 1, 0 |
| 13 | DTX, DTX, DTX | N/A | N/A |

TABLE 6

| Entry Number | HARQ-ACK (0), HARQ-ACK (1), HARQ-ACK (2) | $n_{PUCCH}$ | QPSK |
|---|---|---|---|
| 1 | ACK, ACK, ACK, | $n_{PUCCH}(0)$ | 0, 0 |
| 2 | ACK, ACK, NACK/DTX | $n_{PUCCH}(0)$ | 0, 1 |
| 3 | ACK, ACK, DTX | $n_{PUCCH}(0)$ | 0, 0 |
| 4 | ACK, NACK, NACK/DTX | $n_{PUCCH}(0)$ | 1, 1 |
| 5 | NACK, ACK, ACK | $n_{PUCCH}(1)$ | 1, 1 |
| 6 | NACK, ACK, NACK/DTX | $n_{PUCCH}(0)$ | 1, 0 |
| 7 | NACK/DTX, NACK/DTX, ACK | $n_{PUCCH}(1)$ | 0, 1 |
| 8 | NACK/DTX, NACK/DTX, NACK/DTX | $n_{PUCCH}(1)$ | 0, 0 |
| 9 | DTX, DTX, DTX | N/A | N/A |

TABLE 7

| Entry Number | HARQ-ACK (0), HARQ-ACK (1), HARQ-ACK (2), HARQ-ACK (3) | $n_{PUCCH}$ | QPSK |
|---|---|---|---|
| 1 | ACK, ACK, ACK, ACK | $n_{PUCCH}(2)$ | 0, 1 |
| 2 | ACK, ACK, ACK, NACK | $n_{PUCCH}(1)$ | 1, 0 |
| 3 | ACK, ACK, NACK, ACK | $n_{PUCCH}(3)$ | 1, 1 |
| 4 | ACK, ACK, NACK/DTX, NACK/DTX | $n_{PUCCH}(0)$ | 0, 0 |
| 5 | ACK, NACK, ACK, ACK | $n_{PUCCH}(0)$ | 0, 1 |
| 6 | ACK, NACK, ACK, NACK | $n_{PUCCH}(1)$ | 1, 1 |
| 7 | ACK, NACK, NACK, ACK | $n_{PUCCH}(3)$ | 1, 0 |
| 8 | ACK, NACK, NACK/DTX, NACK/DTX | $n_{PUCCH}(1)$ | 0, 1 |
| 9 | NACK, ACK, ACK, ACK | $n_{PUCCH}(0)$ | 1, 1 |
| 10 | NACK/DTX, NACK/DTX, NACK/DTX, NACK/DTX | $n_{PUCCH}(2)$ | 1, 1 |
| 11 | NACK, ACK, ACK, NACK | $n_{PUCCH}(0)$ | 1, 0 |
| 12 | NACK, ACK, NACK, ACK | $n_{PUCCH}(3)$ | 0, 1 |
| 13 | NACK, ACK, NACK/DTX, NACK/DTX | $n_{PUCCH}(1)$ | 0, 0 |
| 14 | NACK/DTX, NACK/DTX, ACK, ACK | $n_{PUCCH}(2)$ | 0, 0 |
| 15 | NACK/DTX, NACK/DTX, ACK, NACK | $n_{PUCCH}(2)$ | 1, 0 |
| 16 | NACK/DTX, NACK/DTX, NACK, ACK | $n_{PUCCH}(3)$ | 0, 0 |
| 17 | DTX, DTX, DTX, DTX | N/A | N/A |

TABLE 8

| Entry Number | HARQ-ACK (0), HARQ-ACK (1), HARQ-ACK (2) | $n_{PUCCH}$ | QPSK |
|---|---|---|---|
| 1 | ACK, ACK, ACK, | $n_{PUCCH}(2)$ | 0, 1 |
| 2 | ACK, ACK, NACK | $n_{PUCCH}(1)$ | 1, 0 |
| 3 | ACK, ACK, DTX | $n_{PUCCH}(0)$ | 0, 0 |
| 4 | ACK, NACK, ACK | $n_{PUCCH}(0)$ | 0, 1 |
| 5 | ACK, NACK, NACK | $n_{PUCCH}(1)$ | 1, 1 |
| 6 | ACK, NACK, DTX | $n_{PUCCH}(1)$ | 0, 1 |
| 7 | NACK, ACK, ACK | $n_{PUCCH}(0)$ | 1, 1 |
| 8 | NACK/DTX, NACK/DTX, DTX | $n_{PUCCH}(2)$ | 1, 1 |
| 9 | NACK, ACK, NACK | $n_{PUCCH}(0)$ | 1, 0 |
| 10 | NACK, ACK, DTX | $n_{PUCCH}(1)$ | 0, 0 |
| 11 | NACK/DTX, NACK/DTX, ACK | $n_{PUCCH}(2)$ | 0, 0 |
| 12 | NACK/DTX, NACK/DTX, NACK | $n_{PUCCH}(2)$ | 1, 0 |
| 13 | DTX, DTX, DTX | N/A | N/A |

TABLE 9

| Entry Number | HARQ-ACK (0), HARQ-ACK (1), HARQ-ACK (2), HARQ-ACK (3) | $n_{PUCCH}$ | QPSK |
|---|---|---|---|
| 1 | ACK, ACK, ACK, ACK | $n_{PUCCH}(2)$ | 0, 1 |
| 2 | ACK, ACK, ACK, NACK/DTX | $n_{PUCCH}(1)$ | 1, 0 |
| 3 | ACK, ACK, NACK/DTX, ACK | $n_{PUCCH}(3)$ | 1, 1 |
| 4 | ACK, ACK, NACK/DTX, NACK/DTX | $n_{PUCCH}(0)$ | 0, 0 |
| 5 | ACK, NACK/DTX, ACK, ACK | $n_{PUCCH}(0)$ | 0, 1 |
| 6 | ACK, NACK/DTX, ACK, NACK/DTX | $n_{PUCCH}(2)$ | 0, 0 |
| 7 | ACK, NACK/DTX, NACK/DTX, ACK | $n_{PUCCH}(2)$ | 1, 1 |
| 8 | ACK, NACK/DTX, NACK/DTX, NACK/DTX | $n_{PUCCH}(1)$ | 1, 1 |
| 9 | NACK/DTX, ACK, ACK, ACK | $n_{PUCCH}(0)$ | 1, 1 |
| 10 | NACK/DTX, NACK/DTX, NACK/DTX, NACK/DTX | $n_{PUCCH}(1)$ | 0, 1 |
| 11 | NACK/DTX, ACK, ACK, NACK/DTX | $n_{PUCCH}(2)$ | 0, 0 |
| 12 | NACK/DTX, ACK, NACK/DTX, ACK | $n_{PUCCH}(1)$ | 0, 0 |
| 13 | NACK/DTX, ACK, NACK/DTX, NACK/DTX | $n_{PUCCH}(0)$ | 1, 0 |
| 14 | NACK/DTX, NACK/DTX, ACK, ACK | $n_{PUCCH}(3)$ | 0, 0 |
| 15 | NACK/DTX, NACK/DTX, ACK, NACK/DTX | $n_{PUCCH}(3)$ | 0, 1 |
| 16 | NACK/DTX, NACK/DTX, NACK/DTX, ACK | $n_{PUCCH}(3)$ | 1, 0 |
| 17 | DTX, DTX, DTX, DTX | N/A | N/A |

We claim:

1. A method comprising:
    receiving N uplink feedback information elements for carrier aggregation, and
    decoding the N uplink feedback information elements for carrier aggregation, by a set of codewords,
    wherein each codeword comprises a channel selected from M channels and a modulation symbol, and
    wherein channel distribution of uplink feedback information element j is defined as a set $\{n_0^j, n_1^j, \ldots, n_{M-1}^j\}$, where $n_i^j$ is the number of codewords comprising channel i and corresponding to uplink feedback information element j at a certain state, j=0, 1, ... N−1, and i=0, 1, 2, ... M−1, at least two of the uplink feedback information elements have a same channel distribution, and the same channel distribution is that the elements of $\{n_0^j, n_1^j, \ldots, n_{M-1}^j\}$ are the same.

2. The method according to claim 1, wherein at least two of the uplink feedback information elements have a same modulation symbol distribution.

3. The method according to claim 1, wherein each codeword further comprises closely located modulation symbols in a same modulation constellation represent a same uplink feedback information.

4. The method according to claim 3, comprising:
    decoding the same uplink feedback information by neighbouring constellation points with a same channel.

5. The method according to claim 3, wherein the modulation symbol in each codeword belongs to a QPSK constellation.

6. The method according to claim 1, wherein the N uplink feedback information elements comprise at least one of the following:
    acknowledged message (ACK),
    not acknowledged message (NACK),
    discontinuous transmission message (DTX), and
    not acknowledged and/or discontinuous transmission message (NACK/DTX).

7. The method according to claim 1, wherein the channel is defined by a sequence.

8. The method according to claim 1, wherein a codebook for N1 uplink feedback information elements is derived from a codebook for N uplink feedback information elements, wherein N1<N.

9. The method according to claim 8, wherein said codebook for the N1 uplink feedback information elements is obtained by taking the N1 uplink feedback information elements and deleting at least one codeword from the codebook for the N uplink feedback information elements.

10. The method according to claim 8, wherein the feedback for the N1 uplink feedback information elements reuses at least one codeword from the codebook for N uplink feedback information elements.

11. The method according to claim 1, wherein the set of codewords comprises a codeword that represents more than one information state.

12. The method according to claim 1, wherein N is 3 or 4.

13. The method according to claim 1, wherein at least two uplink feedback information elements are arranged for Multiple Input and Multiple Output (MIMO).

14. A non-transitory memory storage medium comprising computer executable instructions comprising:
    receiving N uplink feedback information elements for carrier aggregation, and
    decoding the N uplink feedback information elements for carrier aggregation, by a set of codewords,
    wherein each codeword comprises a channel selected from M channels and a modulation symbol, and
    wherein channel distribution of uplink feedback information element j is defined as a set $\{n_0^j, n_1^j, \ldots, n_{M-1}^j\}$, where $n_i^j$ is the number of codewords comprising channel i and corresponding to uplink feedback information element j at a certain state, j=0, 1, ... N−1, and i=0, 1, 2, ... M−1, at least two of the uplink feedback information elements have a same channel distribution, and the same channel distribution is that the elements of $\{n_0^j, n_1^j, \ldots, n_{M-1}^j\}$ are the same.

15. An apparatus comprising a processor coupled to a receiver, wherein
    the receiver is configured to receive N uplink feedback information elements for carrier aggregation, and
    the processor is configured to decode the N uplink feedback information elements for carrier aggregation, by a set of codewords,
    wherein each codeword comprises a channel selected from M channels and a modulation symbol, and
    wherein at least two of the uplink feedback information elements have a same channel distribution channel distribution of uplink feedback information element j is defined as a set $\{n_0^j, n_1^j, \ldots, n_{M-1}^j\}$, where $n_i^j$ is the number of codewords comprising channel i and corresponding to uplink feedback information element j at a certain state, j=0, 1, ... N−1, and i=0, 1, 2, ... M−1, at least two of the uplink feedback information elements have a same channel distribution, and the same channel distribution is that the elements of $\{n_0^j, n_1^j, \ldots, n_{M-1}^j\}$ are the same.

16. The apparatus according to claim 15, wherein at least two of the uplink feedback information elements have a same modulation symbol distribution.

17. The apparatus according to claim 15, wherein each codeword further comprises—closely located modulation symbols in a same modulation constellation represent a same uplink feedback information.

18. The apparatus according to claim 17, wherein the modulation symbol in each codeword belongs to a QPSK constellation.

19. The apparatus according to claim 15, wherein the N uplink feedback information elements comprise at least one of the following:
    acknowledged message (ACK),
    not acknowledged message (NACK),
    discontinuous transmission message (DTX), and
    not acknowledged and/or discontinuous transmission message (NACK/DTX).

* * * * *